(12) United States Patent
Quinn

(10) Patent No.: US 11,209,927 B2
(45) Date of Patent: Dec. 28, 2021

(54) APPARATUS FOR SENSING USER INPUT

(71) Applicant: Google LLC, Mountain View, CA (US)

(72) Inventor: Philip Quinn, San Jose, CA (US)

(73) Assignee: Google LLC, Mountain View, CA (US)

( * ) Notice: Subject to any disclaimer, the term of this patent is extended or adjusted under 35 U.S.C. 154(b) by 307 days.

(21) Appl. No.: 15/837,714

(22) Filed: Dec. 11, 2017

(65) Prior Publication Data
US 2019/0179469 A1 Jun. 13, 2019

(51) Int. Cl.
G06F 3/041 (2006.01)

(52) U.S. Cl.
CPC .......... *G06F 3/0414* (2013.01); *G06F 3/0416* (2013.01); *G06F 3/0418* (2013.01)

(58) Field of Classification Search
None
See application file for complete search history.

(56) References Cited

U.S. PATENT DOCUMENTS

| 2010/0151916 | A1 | 6/2010 | Baek et al. | |
|---|---|---|---|---|
| 2011/0141053 | A1* | 6/2011 | Bulea | G06F 3/0481 345/174 |
| 2013/0120398 | A1 | 5/2013 | Smyth et al. | |
| 2013/0215040 | A1 | 8/2013 | Bose et al. | |
| 2014/0008999 | A1 | 1/2014 | Prest et al. | |
| 2015/0153895 | A1 | 6/2015 | Hotelling | |
| 2015/0261371 | A1 | 9/2015 | Li | |
| 2016/0358737 | A1 | 12/2016 | Brooks et al. | |
| 2017/0108992 | A1* | 4/2017 | Lee | G06F 3/04186 |
| 2017/0185205 | A1 | 6/2017 | Lu et al. | |
| 2017/0371468 | A1* | 12/2017 | Sarin | G06Q 20/322 |
| 2018/0059866 | A1* | 3/2018 | Drake | G06F 3/0446 |

FOREIGN PATENT DOCUMENTS

| EP | 2508960 | 10/2012 |
|---|---|---|
| EP | 3246806 | 11/2017 |
| TW | 200945179 | 11/2009 |
| TW | 201413504 | 4/2014 |
| WO | WO 2014/037616 | 3/2014 |

(Continued)

OTHER PUBLICATIONS

PCT International Search Report and Written Opinion issued in International Application No. PCT/US2018/047720, dated Oct. 24, 2018, 15 pages.

(Continued)

*Primary Examiner* — William Boddie
*Assistant Examiner* — Alecia D English
(74) *Attorney, Agent, or Firm* — Fish & Richardson P.C.

(57) ABSTRACT

An apparatus for sensing user input to an electronic device is described. The apparatus utilizes multiple strain gauge ("SG") sensing units which are each disposed adjacent an inner surface of the device housing. The SGs are configured to detect a particular type of user input administered to the sides of the device housing based on at least one of: the magnitude of strain applied to the SGs, the relative location of the applied strain, and the duration of the applied strain. The SGs are further configured to detect a second type of user input administered to a display screen of the electronic device caused by bowing of the device housing caused by user contact with the display screen.

11 Claims, 6 Drawing Sheets

(56) References Cited

FOREIGN PATENT DOCUMENTS

| WO | WO 2015/047360 | 4/2015 |
| WO | WO 2016/065482 | 5/2016 |
| WO | WO 2017/004832 | 1/2017 |

OTHER PUBLICATIONS

TW Office Action in Taiwan Application No. 107131258, dated May 27, 2019, 23 pages (with English translation).
PCT International Preliminary Report on Patentability in International Application No. PCT/US2018/047720, dated Jun. 16, 2020, 8 pages.

* cited by examiner

APPARATUS FOR SENSING USER INPUT

BACKGROUND

Some electronic devices include components configured to receive input, such as touch screens and push buttons. Such touch screens are generally configured to sense when and where a user has contacted the touch screen and to enable the electronic device to perform one or more responsive actions. Such push buttons often protrude from an outer or exterior surface of a housing of the electronic device. In general, the push buttons serve as physical inputs that allow users to change device functions (such as volume control, display activation/deactivation, vibrate mode activation/deactivation, etc.). Such buttons are sometimes positioned on the sides of electronic devices such as smartphones, other mobile cellular devices, tablet computers, notebook computers, and desktop computers.

SUMMARY

An apparatus for sensing user input to an electronic device is described. The apparatus utilizes multiple strain gauge ("SG") sensing units which are each disposed adjacent an inner surface of the device housing. The SGs are configured to detect a particular type of user input administered to the sides of the device housing based on at least one of: the magnitude of strain applied to the SGs, the relative location of the applied strain, and the duration of the applied strain. The SGs can be arranged in particular configurations to sense applied strain along, for example, a lengthwise dimension of the device and/or a widthwise dimension of the device. The electronic device can further include a display screen which may or may not be touch-sensitive.

Even though the SGs may be positioned to sense input along the sides of the device housing, the SGs may also be configured to detect strain that results from pressure applied to the display screen as part of a user's interaction with the display screen (e.g., a user's touching or pressing on the display screen with a finger or stylus). To determine the intensity of a user's press on the display screen, an electronic device may employ a look-up table that had been previously generated by applying a plurality of test pressures to different areas of the display screen. In embodiments in which the display screen is a touch-sensitive display screen, the electronic device can further use information on the location of the user touch/press to determine the pressure of the touch/press, even though the display screen itself may not be configured to determine the pressure of a touch/press (e.g., only the location and size of the touch/press).

The electronic device can also identify pressure profiles for each of the SGs and/or for a combination of SGs that can be used to differentiate user input applied along the sides of the electronic device housing (e.g., at or near the locations of the SGs) from user input applied to the display screen. In some embodiments in which the display screen is a touch-sensitive display screen, the electronic device can use input (or lack of input) at the touch screen to determine if strain sensed by the SGs results from user input applied to along the sides of the electronic device housing (e.g., at or near the locations of the SGs) or from user input applied to the display screen. Hence, the SGs can serve a dual purpose of sensing input applied to the sides of the electronic device housing and sensing the degree of pressure of a user touch/press input administered to the display screen of the device.

In some embodiments, the electronic device can use this information to differentiate between multiple levels of inputs on the display screen (e.g., touch, light-press, and hard-press inputs). The electronic device can then perform different actions in response to user input on the touch screen, responsive to determining whether the user input is a touch, light-press, or hard-press. Hence, the described sensing apparatus provides methods and techniques for receiving user input to an electronic device while also replacing or limiting the need for physical buttons that protrude beyond an exterior surface of the device. The described sensing apparatus also replaces or limits the need for sensors that measure pressure administered to a display screen of a device, and that are not capable of detecting input that is distinct from input provided to the display screen.

In one innovative aspect of the specification, an apparatus for sensing user input provided on an exterior surface of an electronic device and/or to a display screen of the electronic device is described. The apparatus is configured for inclusion in an electronic device (such as a smart phone, tablet device, or personal computer) and can be configured to sense user input provided on an exterior surface of an electronic device as well as user input provided on a display screen of the electronic device. In general, in one aspect, the apparatus can include a housing; a plurality of strain gauges coupled to the housing of the electronic device; a display screen positioned along a front surface of the electronic device; an electronic circuit electrically coupled to the plurality of strain gauges; and a memory storing instructions that, when executed by the electronic circuit, cause the electronic circuit to perform operations. The operations can include (i) receiving a first signal indicative of strain sensed by at least one of the plurality of strain gauges, (ii) analyzing the received first signal to determine that the received first signal is indicative of a selected input type from among a plurality of candidate input types, wherein the plurality of candidate input types include (1) user input at a location on the display screen and (2) user input at the housing, and (iii) causing the electronic device to perform a first action in response to determining that the received first signal is indicative of the selected input type.

These and other embodiments can each optionally include one or more of the following features. Determining that the received first signal is indicative of the selected input type can include determining that the received first signal is indicative of user input at the location on the display screen. The operations can further include determining a pressure value for the user input at the location on the display screen based on a magnitude of the received first signal. Causing the electronic device to perform the first action can be performed in response to determining that the pressure value for the user input at the location on the display screen satisfies a predefined criterion. The operations can further include receiving a second signal indicative of strain sensed by at least one of the plurality of strain gauges; analyzing the received second signal to determine that the received second signal is indicative of a second user input at a second location on the display screen; determining a second pressure value for the second user input at the second location on the display screen based on a magnitude of the received second signal, the second pressure value being different than the pressure value; and causing the electronic device to perform a second action in response to determining that the second pressure value for the second user input at the second location on the display screen satisfies a second criterion, the second action being different than the first action.

The operations can further include receiving a second signal indicative of strain sensed by at least one of the plurality of strain gauges; determining that the received second signal is indicative of a second user input at the location on the display screen; determining a second pressure value for the second user input at the location on the display screen, wherein the pressure value for the user input at the location on the display screen is indicative of a first type of user input, the second pressure value for the second user input at the location on the display screen is indicative of a second type of user input, and the first type of user input is different than the second type of user input; and causing the electronic device to perform a second action in response to determining the second pressure value for the second user input at the location on the display screen, the second action being different than the first action. The first type of user input can be a touch user input and the second type of user input can be a press user input. The first type of user input can be a soft-press user input and the second type of user input can be a hard-press user input The operations can further include receiving a second signal indicative of strain sensed by at least one of the plurality of strain gauges; determining that the received second signal is indicative of user input that interacts with the housing in distinction to user input at a location on the display screen; and causing the electronic device to perform a second action in response to determining that the received second signal is indicative user input that interacts with the housing in distinction to user input at a location on the display screen, the second action being different than the first action. The display screen can be a touchscreen. Determining that the received first signal is indicative of user input at the location on the display screen can include receiving a signal from the touchscreen indicative of user contact with the touchscreen. Determining that the received second signal is indicative of user input that interacts with the housing in distinction to user input at a location on the display screen can include determining, by the electronic circuit, that user input has not been detected by the touchscreen. Determining that the received first signal is indicative of the selected input type can include determining that the received first signal is indicative of user input that interacts with the housing. The display screen can be a touchscreen. The operations can further include receiving by the electronic circuit and from at least one of the plurality of strain gauges, a second signal indicative of second strain sensed by at least one of the plurality of strain gauges; receiving, by the electronic circuit and from the touchscreen, a third signal indicative of user contact with the touchscreen at a second location; determining, by the electronic circuit and using the second and third signals, that the second strain sensed by the at least one of the plurality of strain gauges and the user contact with the touchscreen at the second location occur at least partially concurrently; determining that the second signal is indicative of second user input at the second location on the display screen in response to determining that the second strain sensed by the at least one of the plurality of strain gauges and the user contact with the touchscreen at the second location occur at least partially concurrently; determining a second pressure value for the second user input at the second location on the display screen based on a magnitude of the second signal; and causing the electronic device to perform a second action in response to determining that the second signal is indicative of user input at the second location on the display screen and determining the second pressure value for the second user input at the second location on the display screen.

Determining that the received first signal is indicative of the selected input type can include determining that the received first signal is indicative of a soft-press input on the display screen. Causing the electronic device to perform a first action can be performed in response to determining that the first signal is indicative of the soft-press input on the display screen. The operations can further include receiving a second signal indicative of second strain sensed by at least one of the plurality of strain gauges; determining that the received second signal is indicative of a hard-press input on the display screen; and causing the electronic device to perform a second action in response to determining that the second signal is indicative of the hard-press input on the display screen, the second action being different than the first action.

Determining that the received first signal is indicative of the touch input on the display screen can include determining a first pressure value for the first signal. Determining that the received second signal is indicative of the press input on the display screen can include determining a second pressure value for the second signal, the second pressure value being greater than the first pressure value. The first pressure value can fall into a first pressure category and the second pressure value can fall into a second pressure category, the first pressure category being different from the second pressure category. Determining that the received first signal is indicative of the touch input on the display screen can include accessing a look-up table of signal values and comparing the first signal to the signal values in the look-up table to determine that the first signal is indicative of the touch input. Determining that the received second signal is indicative of the press input on the display screen can include accessing the look-up table of signal values and comparing the second signal to the signal values in the look-up table to determine that the second signal is indicative of the press input.

The subject-matter described in this specification can be implemented in particular embodiments and can result in one or more of the following advantages. The technology described in this specification allows device manufacturers to produce electronic devices with a reduced quantity of buttons protruding from an exterior surface of the device housing. Reducing the number of buttons can minimize steps required during execution of manufacturing and/or machining operations when producing device housings in substantial volumes. Furthermore, use of the SGs described in this specification can reduce the amount of circuit components (wires, capacitors, etc.) and reduce the power consumption typically required to enable sensing functions provided by mechanical buttons. Additionally, the SGs can perform dual functions of both sensing user input along the sides of an electronic device and also sensing a degree of pressure of a user touch/press input on a display screen of the electronic device, thereby limiting the need for separate, distinct touch screen pressure sensors and thus allowing for a smaller design configuration (e.g., because space is not necessary to house additional touch screen pressure sensors). Furthermore, a reduction in the number of moving components (push buttons) and sensing components (separate touch screen pressure sensors) reduces manufacturing costs and the number of components that could possibly break or require maintenance. Embedding the SGs into the side walls of a device minimizes the volume requirements of the SGs, because they can be located in a channel that is defined in the side wall and that may otherwise constitute unused space.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
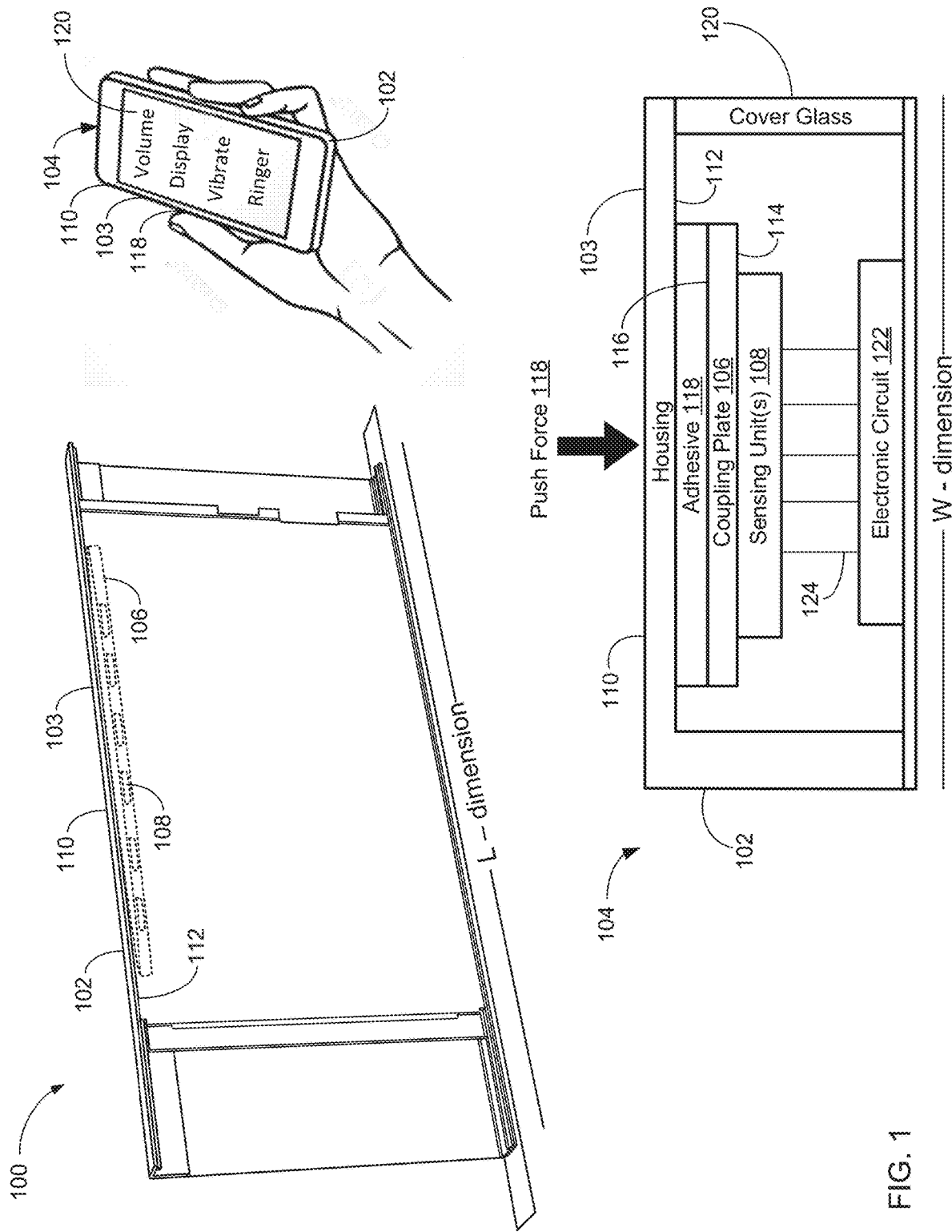
FIG. 1 illustrates diagrams associated with an apparatus for sensing user input to an example electronic device.

This disclosure describes systems, methods, and apparatus for sensing user input to an electronic device. The apparatus utilizes multiple strain gauge ("SG") sensing units, which are each disposed adjacent an inner surface of a housing of the electronic device. The apparatus includes an electronic circuit that electrically couples to each SG. The electronic circuit is generally configured to receive signals in response to user input that interacts with the housing or other portions of the electronic device and that actuates one or more of the SGs. The electronic circuit can differentiate between signals that indicate strains that result from input administered to a side of the housing and input administered to a display screen of the electronic device. In circumstances in which the electronic circuit determines that the user input is administered to the display screen, the electronic circuit can further utilize the signals to determine an amount of pressure applied to the display screen by the user input.

User input to the device can include pressure that is applied to an area of the outer surface of the housing. The area at which the user input is applied can be either adjacent to, or substantially adjacent to, a particular SG that is affixed to an inner surface of the housing. The inner surface of the housing may be on a first side of a housing wall that defines the inner and outer surfaces, while the user input may be applied to the outer surface. In response to the SG sensing applied strain, the device determines a particular type of user input to the device based on at least one of: a magnitude of the applied strain, the relative location of the applied strain, or a duration of the applied strain.

User input to the device can further include touch and/or press inputs applied to the display screen of the electronic device. Such user input can cause all or a portion of the housing to bow. This bowing of the housing can result in strain that is sensed by one or more of the SGs. The electronic circuit can detect the strain sensed by the one or more SGs and determine that a particular type of user input has been administered to the display screen, such as a touch, soft-press, or hard-press. The electronic circuit can determine various aspects of the user input to the display screen based on the detected strain at the one or more SGs (either alone, or in combination with input received by one or more other sensors of the electronic device) including: a magnitude of the user input to the display screen, the relative location of the user input to the display screen, and/or the duration of the applied strain.

In general, each SG sensing unit includes multiple individual strain gauges that each have a particular resistance attribute. The SGs can be arranged in a particular configuration to form a single SG sensing unit and each SG sensing unit can receive a voltage signal of a predefined voltage value. One or more output voltage signals received from each SG sensing unit are then measured by the electronic circuit and then converted into an example signal. The output voltage signals are measured to detect any shifts or changes to the corresponding voltage value of the applied signal.

Applying strain to the outer surface of the housing or to the display screen can cause slight physical changes (e.g., expansion or contraction) to at least one SG of a SG sensing unit. The physical changes can cause a change in a resistance attribute of a SG. The change in the resistance attribute causes a corresponding change in the measured output voltage value and, thus, indicates a differential voltage signal that is received and measured by the electronic circuit. A range of differential output voltage signal values can be mapped to individual user input types. The mapped values can be used by the electronic device to detect or determine particular user input types based on a characteristic of the applied strain and the corresponding signal value caused by the applied strain, including designating the strain as resulting from either user input along the sides of the housing or user input on the display screen. In some embodiments, input received by touch-sensitive components of the touch screen is used in combination with the signals derived from changes in voltage attributes of the SGs to identify particular types of user input received by the electronic device.

The electronic circuit can identify a baseline output voltage for the SG such that measured output voltage values can be compared to the baseline output voltage to determine if a change in the measured output voltage has occurred. For example, the electronic circuit can identify a running average for output voltage over a period of time (e.g., ten minutes) to establish a baseline output voltage value. In some cases, sudden or brief spikes in output voltage are ignored by the electronic circuit when identifying the baseline output voltage. The electronic circuit can continually compare current output voltage samples to the baseline to determine if a change in the measured output voltage indicative of a user applying pressure to a SG has occurred.

FIG. 1 depicts diagrams associated with an apparatus 100 for sensing user input to an example electronic device. Apparatus 100 generally includes a housing 102 that can later receive multiple electronic components to form user device 104. In general, user device 104 can include smartphones, mobile devices, cellular devices, smart televisions, laptop computers, tablet computers, notebook computers, desktop computers, electronic readers, home automation devices, or a variety other types of computing devices or consumer electronic devices.

Apparatus 100 further includes coupling plate 106 and multiple SG sensing units 108 (hereinafter "sensing unit 108"). As discussed in more detail below, each sensing unit 108 can include multiple strain gauges that can form sets of strain gauges that are arranged in a particular configuration within the unit. As generally shown, housing 102 can include a housing wall having an outer surface 110 corresponding to a first side of the wall and an inner surface 112 corresponding to a second side of the wall that is opposite the first side. Similarly, plate 106 can have a first side 114 and a second side 116 that is opposite the first side 114.

In some embodiments, plate 106 can include multiple sensing units 108 affixed to first side 114. As shown, plate 106 can be affixed or bonded to inner surface 112 by adhesive 118 that can be disposed generally intermediate second side 116 and housing wall 103. Plate 106 can be formed from a variety of different materials such as steel, fiberglass, hardened plastic or other materials having properties that enable plate 106 to be affixed to wall 103. Adhesive 118 can be any adhesive material or compound such as glue, epoxy resin, bonding agent, or other materials suitable to securely affix/attach plate 106 to inner surface 112 of housing wall 103. Additionally, although identified as an adhesive, a variety of mechanical based fastening means suitable to securely affix/attach or couple plate 106 to inner surface 112 can also be utilized.

Housing 102 can receive multiple electronic components to form user device 104, which includes cover glass 120. Hence, apparatus 100 can include an example electronic circuit 122 that is disposed internally within device 104. Wire(s)/conductor(s) 124 can electrically couple, to circuit 122, one or more strain gauge sets within sensing unit 108. In some embodiments, the electronic circuit 122 includes an amplifier for amplifying the voltage of electronic signals received from the one or more strain gauges. The electronic circuit 122 can additionally include an analog-to-digital converter (ADC) for converting voltages received from the one or more strain gauges to digitally quantized values. In some embodiments, the amplifier and/or ADC can be implemented separately from the electronic circuit 122 and can be positioned along the electrical communication path of the wires/conductors 124 between the electronic circuit and the one or more strain gauges. In some embodiments, the user device 104 includes a separate amplifier and ADC for each strain gauge to individually amplify and digitally quantize individual voltage signals from each strain gauge.

As discussed in more detail below, an example user can provide a particular type of user input to device 104 by applying a push force 118 that can vary in push force magnitude and push force duration and/or frequency. Push force 118 provides a corresponding strain force that is applied to a particular SG set in respective sensing units 108 affixed to inner surface 112 of housing wall 103. In general, sensing units 108 can be arranged in particular configurations to sense/detect applied strain along, for example, a lengthwise (L) dimension of device 104 and/or a widthwise (W) dimension of device 104.

The applied strain can be detected by a signal received by one or more components of circuit 122. A value of the detected signal can correspond to a particular type of user input. In some embodiments, the type of user input can be viewable via a display device through cover glass 120. Different input types can include, for example, user input to adjust an audio volume output of user device 104, user input to activate or deactivate a display device of user device 104, user input to activate or deactivate a vibrate mode of user device 104, and/or user input to adjust the volume of a ring tone of user device 104. In alternative embodiments, a variety of different user input types can be detected based, at least in part, on a particular value of the detected signal.

As an example, apparatus 100 can be used in the following embodiment. A user, Frank, wants to change the volume on a computing device, e.g., Frank's smartphone. Apparatus 100 can be implemented within Frank's smartphone such that sensing units 108 are disposed along, for example, a lengthwise edge of Frank's smartphone. When Frank presses a part of the smartphone housing associated with a volume setting a particular strain gauge within sensing unit 108 is strained.

In response to the press applied by Frank, a change in a differential voltage value is detected by an electronic circuit disposed within Frank's smartphone. The smartphone can be configured to detect the differential voltage value and associate particular values with, for example, a volume press because the detected voltage change exceeds a threshold voltage change. A duration of the voltage change is measured, and the electronic circuit (which can be part of a microprocessor) outputs a value which indicates to the microprocessor that it is to change the volume of an audio signal that is being output by a speaker of Frank's smartphone.

In some embodiments, the electronic circuit 122 includes an ADC that converts the differential voltage value to a digital quantized value. For example, differential voltages ranging from −3V to 3V output by the sensing unit 108 can be converted to ADC units or "counts" ranging from 0 to 10,000. This range of ADC counts can be divided into a number of discrete ranges (e.g., five ranges of 2000 counts each or six ranges of 1666 counts each). When the example user presses a part of the smartphone housing associated with the volume setting strain gauge, an output voltage of the corresponding sensing unit 108 is converted to a quantized count number by the ADC. The output value of the ADC can be categorized into one of the discrete count ranges to identify a particular input indicated by the user. For example, a volume of the smartphone can be increased at varying rates based on the identified count range for a particular output value of the ADC.

Figure 2:
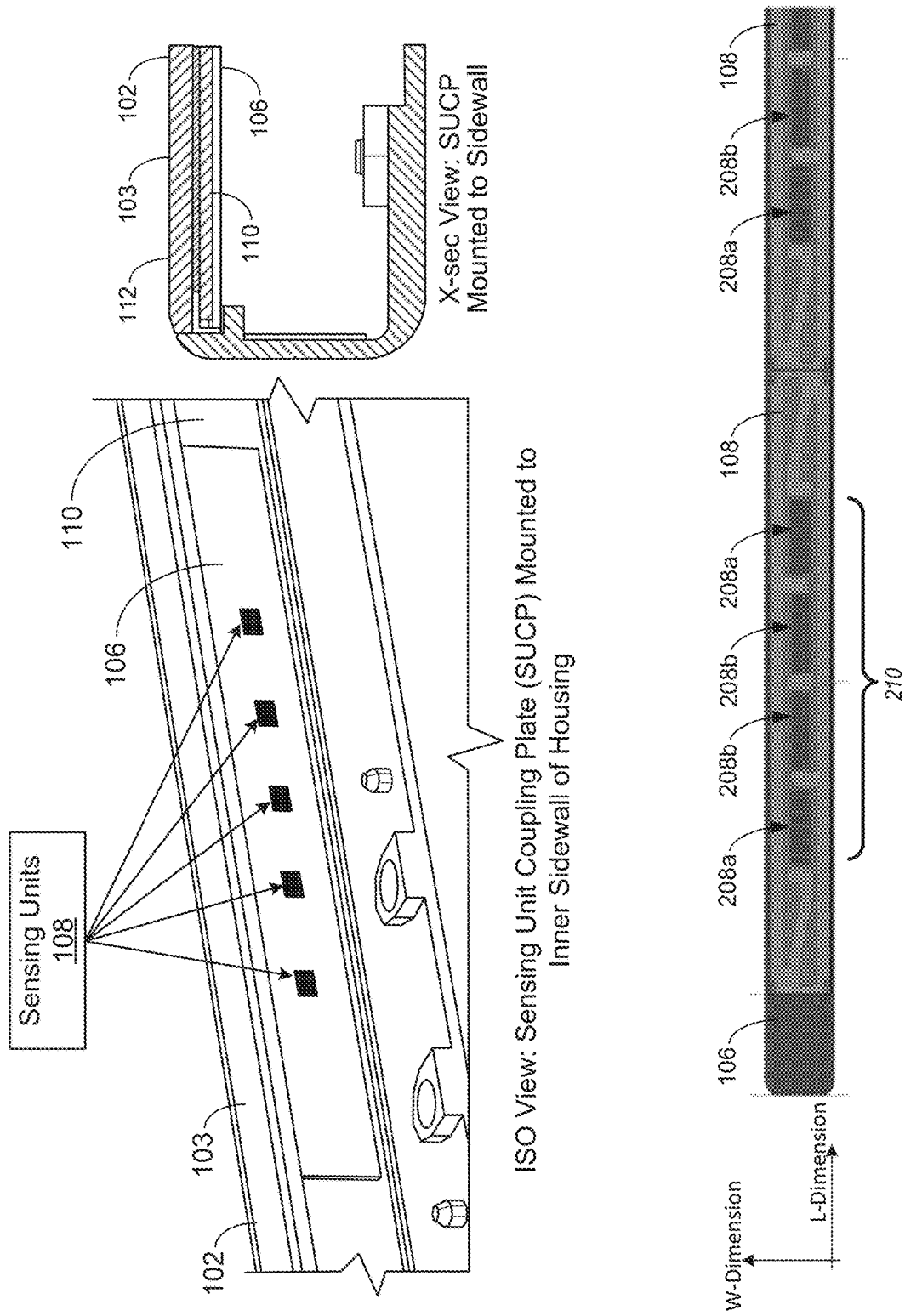
FIG. 2 illustrates diagrams that include multiple strain gauges that can be used in the apparatus of FIG. 1.

FIG. 2 illustrates diagrams that include multiple strain gauge units that can be used in sensing units 108 of apparatus 100. As shown, the embodiment of FIG. 2 includes multiple technical features described above with reference to FIG. 1. In particular, FIG. 2 illustrates, in part: 1) an isolation (ISO) view that generally depicts multiple individual sensing units 108 attached to plate 106 that is affixed to inner surface 110 of housing wall 103; and 2) a cross-section (X-sec) view that depicts plate 106 attached/affixed to inner surface 110 of housing wall 103.

Each sensing unit 108 can include multiple strain gauge units 208 that form sets of strain gauges that are arranged in a particular configuration within sensing unit 108. In some embodiments, at least two SGs 208 can form a SG set 208a/b and multiple SG sets 208a/b can form a SG grouping 210. When disposed against, or affixed to, inner surface 110, multiple SG sets 208a/b can be arranged in particular orientations relative to each other. For example, a first SG set 208a can be arranged in a first orientation corresponding to a first dimension so as to detect or measure applied strain along the first dimension. Likewise, a second SG set 208b can be arranged in a second orientation corresponding to a second dimension so as to detect or measure applied strain along the second dimension.

In general, the first orientation and the first dimension can be different from the second orientation and the second dimension. In some embodiments, when user device 104 is positioned generally longitudinally upright (e.g., when held by a user), the first orientation can correspond to a vertical orientation and the first dimension can correspond to a lengthwise (L) dimension. Further, when in this longitudinally upright position, the second orientation can correspond to a horizontal orientation and the second dimension can correspond to a widthwise (W) dimension.

In the embodiment of FIG. 2, when disposed within user device 104, SG grouping 210 can have a SG set 208a that includes two SGs 208 disposed in a horizontal orientation (when the device is upright) to measure applied strain to surface 112 in the widthwise dimension. Moreover, SG grouping 210 can also have a SG set 208b that includes two SG units 208 disposed in a vertical orientation (when the device is upright) to measure applied strain in the lengthwise dimension. As shown, SGs 208 of SG grouping 210 can each be arranged in a parallel configuration, relative to each other, and can be disposed generally along the lengthwise dimension of a wall 103 (e.g., a sidewall) of housing 102.

When installed within user device 104, each SG grouping 210 of sensing unit 108 can be used to detect or sense user input in the form of applied force to surface 112. The applied force can cause SGs 208 to change in electrical characteristics, to cause the electronic circuit 122 to sense an increased strain. User device 104 can be configured to recognize the increased strain as corresponding to different user input types such as a user pushing, swiping, tapping, squeezing or otherwise touching a particular area on a sidewall wall or cover glass 120 of user device 104.

For example, when a user pushes on an edge or sidewall of housing 102 that is adjacent a SG 208, the housing and plate 106 can bend or flex, causing SG 208 to change in electrical characteristics (e.g., the resistance of resistors change within a particular strain gauge), which affects the voltage of an electrical signal applied to the SG 208 and which causes the electronic circuit 122 (analyzing the electrical signal) to sense an increased strain along, for example, the lengthwise dimension of device 104. Accordingly, user device 104 senses a push on the edge of housing 102 and can indicate to the user, via an example display device (protected by cover glass 120), the particular input type associated with the user's push/touch. In some embodiments, multiple sensing units 108 can be disposed or positioned along an edge or sidewall of housing 102 in order to sense or detect the particular input type and/or the proximate location of the push applied along the length of device 104. The electronic circuit 122 can analyze the electrical signal that is received from each of the SG set 208a and SG set 208b.

As an overview of the terminology used herein, user device 104 may include multiple sensors or sensing units 108. Each sensing unit 108 may include two strain gauge sets indicated as features 208a and 208b. As an example, strain gauge set 208a can be oriented vertically and strain gauge set 208b can be oriented horizontally. Each strain gauge set 208a or 208b includes two individual strain gauge units 208. More particularly, and stated another way, each sensing unit 108 includes four strain gauge units 208 or resistors 208 (discussed below with reference to FIG. 3) which form the two strain gauge sets 208a/b or circuit branches (discussed below with reference to FIG. 3). Reference feature 210 refers to a strain gauge grouping that includes the four individual strain gauges 208 that collectively form a single sensor 108.

Figure 3:
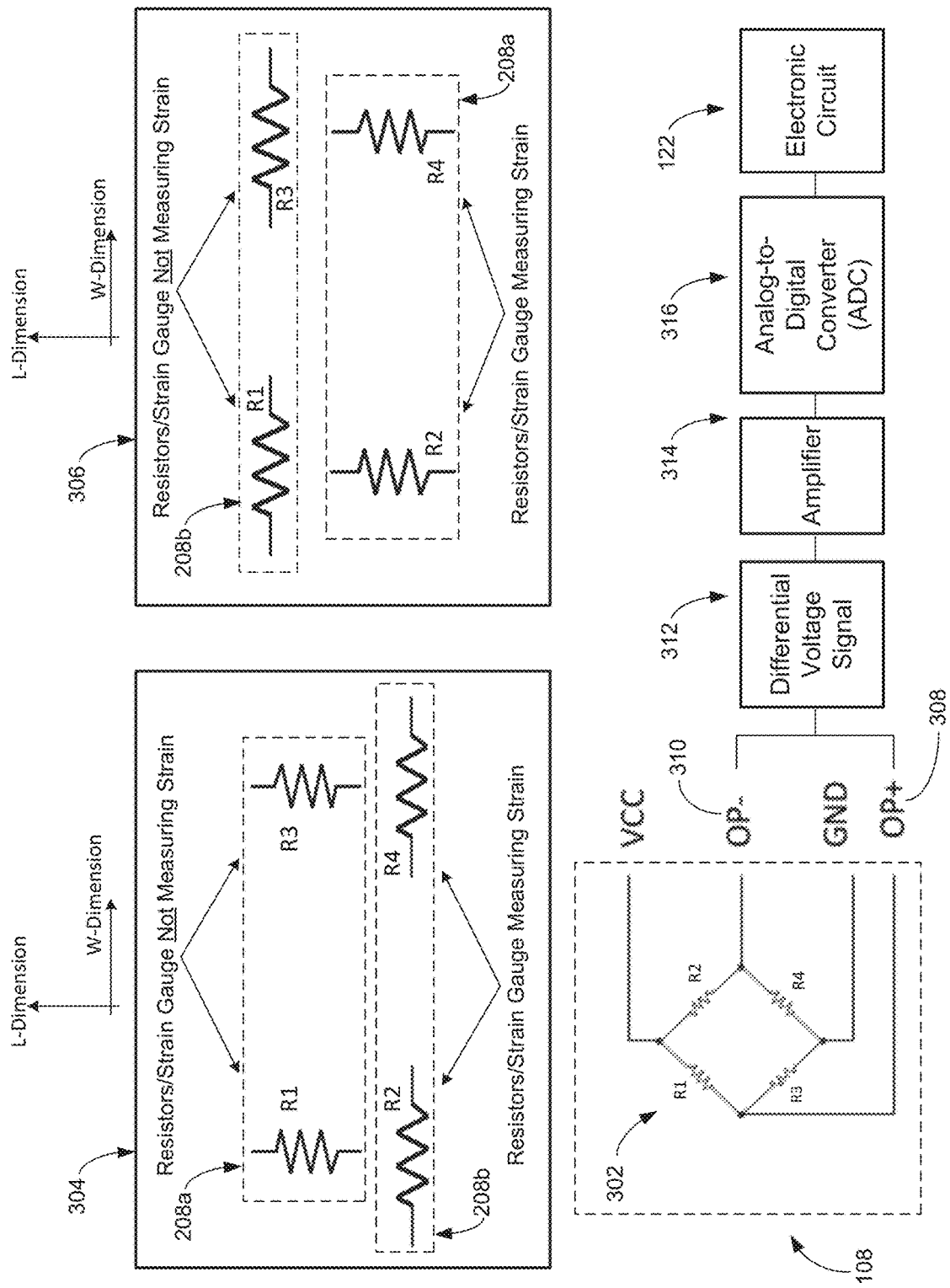
FIG. 3 illustrates diagrams that include resistor configurations, an example bridge circuit, an amplifier, and an analog-to-digital converter that can be implemented to sense user input to an electronic device.

FIG. 3 illustrates diagrams that include resistor configurations, an example bridge circuit 302, and various other electronic components that can be used to sense user input to an electronic device. As discussed above, each sensing unit 108 includes multiple individual SGs 208 that each have a particular resistance attribute. Hence, as shown in FIG. 3, in alternative embodiments SG 208 can be depicted as one of resistors (R1-R4) that each have an initial resistance value or resistance attribute which can, in some embodiments, change in response to applied pressure. In particular, sensing unit 108 can be modeled or depicted as bridge circuit 302 that includes positive (voltage polarity) output 308 and negative (voltage polarity) output 310.

As shown, in some embodiments, resistor orientation 304 can include resistors R2 and R4 having a horizontal orientation so as to measure applied strain in the widthwise (W) dimension, while resistors R1 & R3 (vertical orientation) remain relatively fixed when strain is applied due to their orientation and, thus, do not measure applied strain. In contrast, resistor orientation 306 can include resistors R2 and R4 having a vertical orientation so as to measure applied strain in the lengthwise (L) dimension while resistors R1 & R3 (horizontal orientation) remain relatively fixed when strain is applied due to their orientation and, thus, do not measure applied strain.

In general, when a particular set of resistors are disposed perpendicular to a particular strain direction, that particular resistor set will generally not measure strain associated with that particular strain direction. For example, as shown in resistor orientation 304, for a strain force applied in the widthwise (W) dimension/direction, SG set 208a is perpendicular to the strain direction and, thus, will generally not measure applied strain. However, SG set 208b is parallel to the strain direction and will measure applied strain. Further, as shown in resistor orientation 306, for a strain force applied in the lengthwise (L) dimension/direction, SG set 208b is perpendicular to the strain direction and, thus, will generally not measure applied strain. However, SG set 208a is parallel to the strain direction and will measure applied strain.

In general, bridge circuit 302 includes two branches. A first branch is indicated by R1 & R3 and the output node (for output 308) intermediate R1 & R3. A second branch is indicated by R2 & R4 and the output node (for output 310) intermediate R2 & R4. Bridge circuit 302 can receive an applied voltage (VCC). Electronic circuit 122 can receive or detect a differential voltage signal 312 in response to a change in the resistance attribute of any one of resistors R1-R4. In some embodiments, circuit 122 provides the VCC voltage signal and can then execute a basic comparator circuit to analyze signal 312 relative to the VCC signal. The analysis can enable circuit 122 to detect or determine the extent to which the measured value of signal 312 indicates a deviation from the initially applied VCC voltage value. In some embodiments, the differential voltage signal 312 is passed through an amplifier 314 and analog-to-digital converter (ADC) 316 prior to reaching the electronic circuit 122. In some embodiments, the amplifier 314 and/or the ADC 316 are implemented as part of the electronic circuit 122.

The ADC 316 can be, for example, a 24-bit ADC that quantizes input voltages into ADC units or "counts." For example, the ADC can quantize input voltages into a range of values from 1 to 10,000 counts. The ADC 316 can additionally have an allowable input voltage range. For example, the allowable input voltage range for the ADC 316 can be from −3 V to +3 V.

During operation, and when disposed along inner surface 110 within user device 104, sensing unit 108 can detect applied strain in response to a touch force that is applied to a certain location of housing wall 103 (e.g., an edge/sidewall of user device 104). For example, and as noted above, user input in the form of applied strain to the edge of device 104 can cause signals to be received by electronic circuit 122. The signals can be received in response to user input detected by sensing unit 108, e.g., SG grouping 210, and can indicate a user input of a particular type, e.g., volume adjustment, activate vibrate mode, etc. Hence, detection of the user input can cause a corresponding response from device 104, e.g., indication on the display device associated with a volume level increasing or decreasing.

For example, and with reference to bridge circuit 302, sensing unit 108 can include SG set 208a (resistors R1 & R3) that indicates a signal having a first voltage value (via output node 308). Sensing unit 108 can further include SG set 208b (resistors R2 & R4) that indicates a signal having a second voltage value (via output node 310). The first voltage value and the second voltage value can be indicated concurrently in response to the user input of a particular type that causes a particular corresponding response from user device 104.

In some examples, applied strain in the W-dimension can cause physical changes to SG set 208b that in turn causes the resistance attribute of resistors R2 & R4, measured in ohms, to change (either increase or decrease) by a predefined amount based on the magnitude of the applied force. Accordingly, presuming all resistance values in circuit 302 are generally the same, the change in a resistance attribute of R2 & R4 will cause a corresponding change in the voltage value measured at output 310. Thus, a differential voltage signal 312, relative to outputs 308 and 310, will be measured or detected by electronic circuit 122. In some embodiments, the differential voltage signal 312 can be, for example, in the microvolt or the millivolt range. Thus, the differential voltage signal 312 can be amplified by the amplifier 314. As previously described, the amplifier 314 can be implemented as a standalone circuit, or as part of the electronic circuit 122.

In some embodiments, the difference between the differential voltage signal 312 when the sensing unit 108 is not being pressed and the differential voltage signal 312 when the sensing unit 108 is being pressed can be, for example, 100 mv or smaller. The amplifier 314 can amplify the differential voltage signal 312 to increase the resolution of the difference between the differential voltage signal 312 when the sensing unit 108 is being pressed and the differential voltage signal 312 when the sensing unit 108 is not being pressed. In some embodiments, the amplifier 314 is adjustable and the amplification level of the amplifier 314 is controlled by the electronic circuit 122. The electronic circuit 122 can control the amplifier 314 to amplify the differential voltage signal 312 such that the resolution of the difference between the differential voltage signal 312 value in different states is maximized while avoiding "railing" (i.e., exceeding a maximum voltage) of the signal.

For example, the ADC 316 can have an allowable input voltage range such that input voltages outside of that range are not accurately converted to a digitally quantized value. For example, the ADC 316 can have an allowable input range of −3V to +3V. If the output of the amplifier 314 is greater than +3V or less than −3V, the ADC 316 is not able to accurately convert the input signal to a number of ADC units or "counts." The electronic circuit 122 therefore controls the voltage multiplier of the amplifier 314 such that the output of the amplifier 314 does not fall outside of the allowable voltage range for the ADC 316. In some embodiments, the allowable voltage range can be defined by a component other than the ADC 316. For example, the electronic circuit 122 can define the allowable voltage range for output voltages of the amplifier 314.

In some embodiments, the range of values for the differential voltage signal 312 produced by the bridge circuit 302 can change over time due to factors such as damage to the sensing unit 108, wear and tear, changes in temperature, changes in atmospheric pressure, or degradation of components of the sensing unit 108 over time. The electronic circuit 122 can control the amplification level of the amplifier 314 as the range of values of the differential voltage signal 312 changes such that the output of the amplifier 314 is maximized while still preventing the output of the amplifier 314 from being outside of the acceptable voltage range for the ADC 316.

Continuing with FIG. 3, as discussed above, the bridge circuit 302 produces a baseline differential voltage signal 312 when the sensing unit 108 is in an unpressed state. This baseline differential voltage signal 312 is amplified by amplifier 314 and converted to a digital quantized value by the ADC 316 such that the ADC 316 produces a baseline output value. The baseline differential voltage signal 312 (and consequently the baseline output value of the ADC 316) can change over time due to factors such as damage to the sensing unit 108, wear and tear, changes in temperature, changes in atmospheric pressure, or degradation of components of the sensing unit 108 over time. The electronic circuit 122 can determine a baseline output value of the ADC 316 over a period of time and use this baseline value to detect occurrences of and the extent of user input. For example, the electronic circuit 122 can sample for inputs at the sensing unit 108 (i.e., pressure applied to the sensing unit 108) at a constant rate. The electronic circuit 122 can subtract the baseline output value of the ADC 316 from the output value of the ADC 316 for each sample to determine a differential between the output value for a particular sample and the baseline output value. This determined differential value can then be used to determine if a user has applied pressure to the sensing unit 108 and, in some cases, an extent or value of the pressure applied to the sensing unit 108.

The baseline output value of the ADC 316 can be determined using a number of techniques. As a first example, the electronic circuit 122 can average the sampled output values of the ADC 316 over a particular period of time to identify the baseline value. However, applying a simple average can lead to an incorrect baseline output value of the ADC 316 being identified as such an averaging technique would also include output values when the sensing unit 108 is being pressed.

Another example technique that can be used to determine a baseline output value of the ADC 316 includes filtering out samples over a given period of time that are indicative of a user pressing the sensing unit 108 and averaging the output values for the remaining samples. For example, the electronic circuit 122 can apply a low pass filter (LPF) to output values sampled over a period of ten minutes. The LPF can filter out sudden changes in the output value of the ADC 316 that are indicative of a user pressing the sensing unit 108. For example, output value increases that last for a period shorter than five seconds before returning to a substantially lower output value level can be filtered out. The remaining sampled output values are then averaged to determine the baseline output value of the ADC 316. Another example technique that can be implemented by the electronic circuit 122 to determine a baseline output value of the ADC 316 includes using a high-pass filter with a long period to track the baseline output value.

Figure 4:
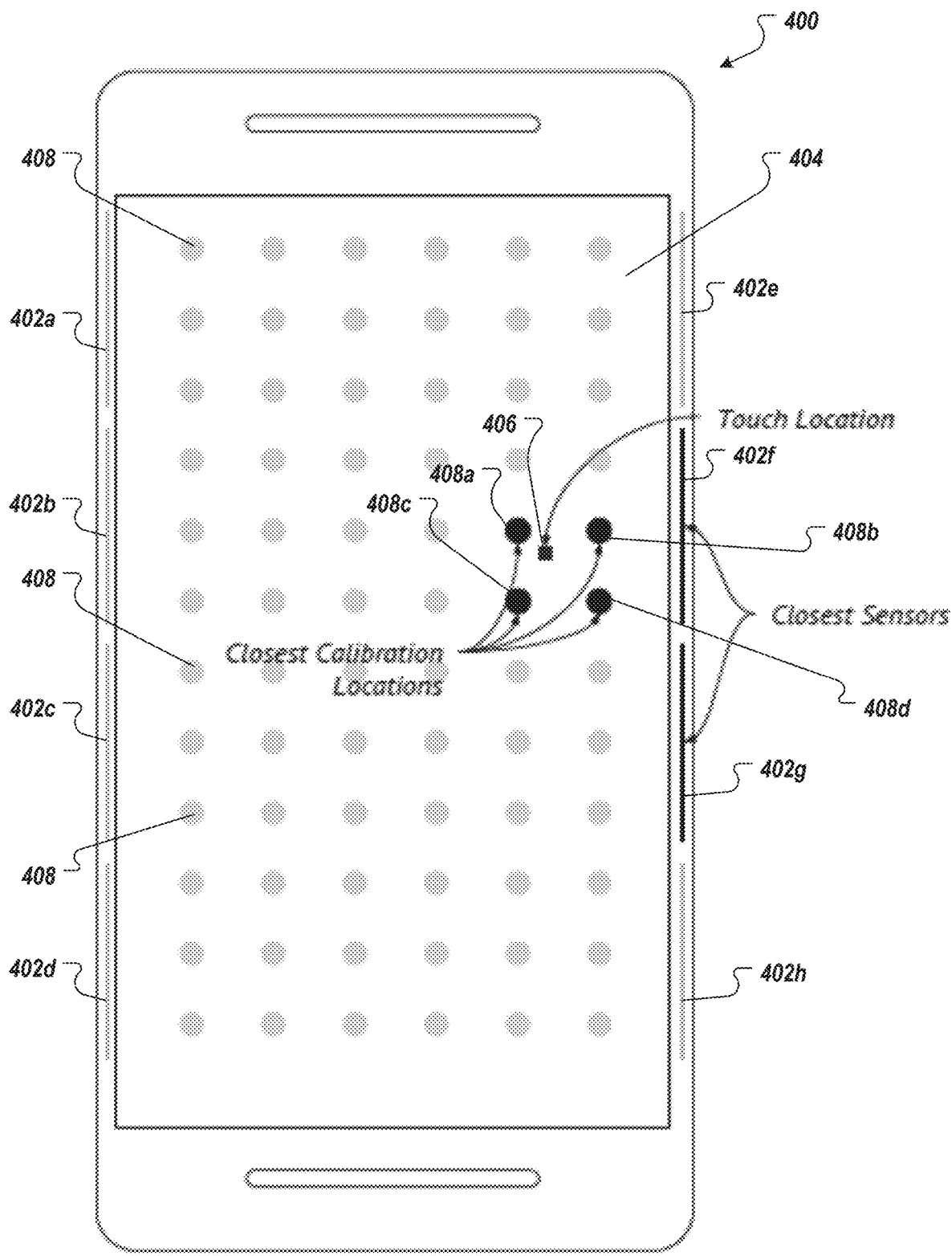
FIG. 4 illustrates an example electronic device having multiple strain gauges for sensing user input.

FIG. 4 shows an example electronic device 400 having a number of SGs 402a-402h. In the particular embodiment shown in FIG. 4, the electronic device includes eight SGs 402, with four SGs 402 positioned along each side of the electronic device 400. Other configurations having more or less SGs or having SGs positioned in other locations, such as along the top, bottom, or back of the electronic device 400 are possible and would function in the same manner in the example electronic device 400 as described below. The electronic device 400 can be, for example, a mobile device such as a smart phone, tablet, electronic reader, home automation device, remote control, personal digital assistant, smart watch, or laptop computer.

The SGs 402a-402h are configured to sense user input in the form of pressure applied to the sides of the electronic device 400 at locations proximate the SGs 402a-402h, as described above. An electronic control circuit of the electronic device 400 (not shown) receives signals (e.g., amplified and digitized signals) generated by the SGs 402a-402h indicative of the sensed user input and uses these received signals to control various actions of the electronic device 400, such as changing a display of the electronic device 400, activating an application, performing an action within an application, adjusting a parameter setting such as a volume setting, and other actions as would be apparent to one skilled in the art. The control circuit can also determine a pressure value for the sensed user input using the received signals. The determined pressure value can be used as a factor in determining an action to perform, or the nature of the action performed. For example, a determination of a first level of pressure administered to the SG 402a can cause the control circuit to increase a volume setting at a first rate, while a determination of a second, higher level of pressure administered to the SG 402a can cause the control circuit to increase the volume setting at a second faster rate.

The control circuit can also use the signals received from the SGs 402a-402h to identify which SG or combination of SGs has been pressed by the user. For example, the user can apply pressure to the SG 402c. This can cause each of the SGs 402b, 402c, 402d to send signals indicating received user input to the electronic circuit due to physical displacement of the housing of the electronic device 400. The control circuit can determine that the level of force received at the SG 402c is significantly higher than the levels of force received at the SGs 402b and 402d and can use this information to identify that the user has applied pressure to the housing of the electronic device 400 proximate the SG 402c. The control circuit can then cause the electronic device 400 to perform an action associated with user manipulation of the SG 402c.

The electronic device 400 further includes a display screen 404. The control circuit can control the display screen 404 to display various user interfaces to the user. Manipulation of one or more of the SGs 402a-402h by the user can cause the control circuit to change aspects of the display shown on display screen 404. For example, selection of the SG 402e by the user can cause the control circuit to display a control menu on the display screen 404 while selection of the SG 402g can cause the control circuit to display a list of open applications running on the electronic device 400.

In some embodiments, the display screen 404 is a touchscreen configured to detect locations of one or more user contacts with the display screen 404. Various touch sensing technologies can be used to identify contact with the touchscreen, including capacitive sensing, infrared sensing, optical sensing, and surface acoustic wave (SAW) technology. In some examples, resistive sensing can be used with touchscreens that include electrically conductive layers separated by a narrow gap. When an object, such as a finger, applies a force to a touchscreen by pressing down on the touchscreen 404, the electrically conductive layers contact one another, causing the touchscreen 404 to behave as a pair of voltage dividers with a connected output. This connection causes a change in the electrical current, which is registered as a contact to a given point of the touchscreen. The change in the electric current can be processed by the control circuit to determine the location of the user input and perform actions in response to the determined location of the user input.

In some examples, capacitive sensing can be used with touchscreens that include a capacitive touch sensor having an array of micro-capacitors. In some examples, states of the micro-capacitors can be affected by a contact to the touchscreen. A contact to the touchscreen distorts the electrostatic field of the touchscreen, which locates the position of the contact. This distortion can be processed by the control circuit to determine the location of the user input and perform actions in response to the determined location of the user input.

In some examples, infrared sensing can be used with touchscreens that include an array of infrared LEDs and photo-detector pairs positioned around the edges of the touchscreen. The LED light beams cross each other in vertical and horizontal patterns, which are disrupted by contact to the touchscreen. The disruption locates the position of the contact and is detected by one or more sensors. A control circuit processes the disruption to determine the location of the user input and perform actions in response to the determined location of the user input. In some examples, optical sensing can be used with touchscreens that include, for example, LEDs positioned around the edges of the touchscreen and can be based on the phenomenon of Frustrated Total Internal Reflection, where LED light beams that traverse the underside of the touchscreen are completely reflected to a photo-detector upon a contact to the touchscreen. In some examples, SAW technology uses ultrasonic waves that travel over the touchscreen. When the touchscreen 404 is contacted, a portion of the ultrasonic waves is absorbed. The resulting changes in the ultrasonic waves locates the position of the contact.

Continuing with a discussion of FIG. 4, the electronic device 400 includes computer readable memory containing instructions that, when executed by the control circuit, cause the control circuit to analyze signals received from one or more of the SGs 402a-402h to determine a pressure of user input applied to the display screen 404. For example, user input applied to the display screen 404, such as a user pressing a finger to a location 406 on display screen 404, can cause all or a portion of the housing of the electronic device 400 to bow. The strain caused by this bowing of the housing can be detected by one or more of the SGs 402a-402h. For example, when a user touches the display screen 404 at the location 406, this can cause bowing of the housing of the electronic device 400, which applies detectable strain to the SGs 402e, 402f, and 402g which are located along the side of the housing near the location 406. The control circuit can detect the strain sensed by the one or more SGs 402a-402h and determine a pressure value for the user input at the location 406. The pressure value can be quantized and identified as falling within a particular pressure range indicative of a particular type of user input. For example, different pressure ranges can be associated with different types of user input to the display screen 404, such as a touch, soft-press, or hard-press. For example, an identified pressure of one or less newtons can be identified as a touch input, while an identified pressure between one and five newtons is identified as a soft-press input and a pressure of greater than five newtons is identified as a hard-press input.

The control circuit can determine various aspects of the user input to the display screen based on the detected strain at the one or more SGs 402a-402h (either alone, or in combination with input received by one or more other sensors of the electronic device 400, such as signals received from the touchscreen) including: a magnitude of the user input to the display screen, the relative location of the user input to the display screen, and/or the duration of the applied strain.

In some embodiments, the control circuit determines the pressure and/or location of a touch input applied to the display screen 404 based on signals received from the SGs 402a-402h by comparing the signals received from the SGs 402a-402h (or information derived from those signals, such as pressure values) to values stored in a lookup table. The lookup table can be partially or entirely stored in memory of the electronic device 400, partially or entirely stored in memory of a remote computing system in communication with the electronic device 400, or a combination of both. The lookup table includes values corresponding to the level of pressure/strain detected by the SGs 402a-402h and corresponding values for various aspects of user input applied to the display screen 404. For example, the SGs 402a-402c can detect first, second, and third strains, respectively and provide signals indicative of these sensed strains to the control circuit. The control circuit can determine pressure values sensed at each of the SGs 402a-402c and compare these values to pressures stored in the lookup table. The lookup table can store a display screen user input pressure value that is indicative of an amount of pressure applied to the display screen 404 by a user input (e.g., a user pressing a finger on the display screen 404) that corresponds to the combination of pressure values of the input sensed at SGs 402a-402c. The control circuit can then use this received user display screen input pressure value to determine one or more aspects of the user input to the display screen 404, such as if the user input at the display screen 404 is a touch input, a soft-press input, or a hard-press input.

In some embodiments, the control circuit can also use the lookup table, or a different lookup table, to determine the location of a user input to the display screen 404 based on signals received from one or more of the SGs 402a-402h. For example, continuing with the example above, the control circuit can compare values of the signals received from the SGs 402a-402c (or values derived from the signals received from the SGs 402a-402c) to values stored in the lookup table to determine a location of the user input to the display screen 404. In some embodiments, the display screen 404 is a touchscreen and the control circuit uses signals received from the touchscreen separate from signals received from the SGs 402a-402c to determine a location of a user input to the display screen 404. In some such embodiments, the control circuit uses signals received from the touchscreen to determine the location of user input on the display screen 404 and signals received from one or more of the SGs 402a-402h to determine a pressure of the same user input on the display screen 404. For example, the control circuit can receive a signal from the touchscreen indicating user contact at location 406 and additionally receive signals from SGs 402f and 402g indicating strain detected at the SGs 402f and 402g. The control circuit can use the signal received from the touchscreen to determine that the user has contacted the display screen 404 at the location 406 and use the signals received from the SGs 402f and 402g to determine a pressure value for the user contact at the location 406 (for example, by comparing values derived from the signals to values stored in the lookup table).

When using the lookup table to identify pressure values for user interaction with the display screen 404 (or a pressure value and a location of the user interaction with the display screen 404), in many scenarios, the values derived by the control circuit from the signals received from the one or more of the SGs 402a-402h and/or the touchscreen may not precisely correlate with values stored in the lookup table. In cases in which the values determined by the control circuit do not precisely match the values stored in the lookup table, the control circuit employs one or more techniques to identify a pressure value for the user contact with the display screen 404 using the lookup table. For example, the control circuit can identify an entry in the lookup table for which the stored values most closely match the determined values and select the associated pressure value for that lookup table entry as the pressure value for the user contact with the display screen 404. In some embodiments, the control circuit will only select the pressure value associated with the lookup table entry that most closely matches the determined values if the determined values and the lookup table entry values are within a threshold value range of each other. If the determined values are more than the threshold away from the values of the lookup table entry that most closely matches the determined values, the control circuit can determine that the pressure value associated with the lookup table entry that most closely matches the determined values is not a correct pressure value for the user input, and make additional determinations, such as a determination that the received signals are indicative of user contact with a side of the housing of the electronic device 400 near one of the SGs 402a-402h, or a combination of user interaction with one of the SGs 402a-402h and user interaction with the display screen 404.

As another example, the control circuit can identify two or more entries in the lookup table that most closely match the determined values and/or that are within a threshold proximity of the determined values and apply a mathematical formula to combine the pressure values associated with the identified entries in the lookup table to determine a pressure value for the user contact with the display screen 404. For example, the control circuit can simply average the pressure values associated with the identified entries in the lookup table to determine a pressure value for the user contact with the display screen 404. As another example, the control circuit can apply a weighted average technique to the pressure values associated with the identified entries in the lookup table to determine a pressure value for the user contact with the display screen 404. The weighted averaging technique can include assigning different weights to different pressure values based on how close the determined values are to the values of each of the identified entries in the lookup table.

In some embodiments, the control circuit uses signals received from the display screen 404 to select entries from the lookup table to include in the process of determining the pressure value of the user contact with the display screen 404. For example, looking at FIG. 4, a user contacts the display screen 404 at location 406 which, in this example, is a touchscreen. The user contact at the location 406 causes the display screen 404 to send signals to the control circuit identifying the location 406 as the location of the user contact. The control circuit can then identify calibration locations 408a-d as the closest calibration locations to the location 406. In this example, the control circuit can then limit the entries in the lookup table that are considered by the control circuit as potential matching entries to only entries that are associated with the calibration locations 408a-d. In other words, the control circuit ignores entries in the lookup table associated with locations other than calibration locations 408a-d and only identifies one or more entries that are relevant to determining the pressure of the user contact with the display screen 404 from among lookup table entries that are associated with the calibration locations 408a-d. When using a weighted average technique along with identification of nearest calibration locations, the weighted average can be calculated, for example, using the equation:

$$\Sigma w_i v_i (\text{where } \Sigma w_i = 1)$$

Where "$w_i$" is the weight assigned for each calibration location and "$v_i$" is the pressure value stored in the look up table for that calibration location. The weights w are determined by the distance between the touch location and the calibration location for $v_i$.

In some embodiments, the control circuit uses signals received from one or more of the SGs 402a-402h and/or the touchscreen to determine if strain sensed at one or more of the SGs 402a-402h is due to user contact with one or more locations along the sides of the housing of the electronic device 400, user contact with the display screen 404, or both. The control circuit uses signals received from one or more of the SGs 402a-402h and/or the display screen 404 to identify user interaction with the electronic device 400 as being one or more specific types of interaction with the electronic device 400, those types of interaction including user contact with the display screen 404, the user applying pressure to a portion of the housing of the electronic device 400 proximate one or more of the SGs 402a-402h, or a combination of user contact with the display screen 404 and user manipulation of the housing of the electronic device 400 proximate one or more of the SGs 402a-402h.

For example, in embodiments in which the display screen 404 is a touchscreen, when the control circuit receives signals from one or more of the SGs 402a-402h indicating strain sensed at one or more of the SGs 402a-402h, the control circuit can also determine whether or not a signal indicative of a user contacting the display screen 404 has been received from the display screen 404. The control circuit can use these signals, including timing information for these signals, to determine if the strain sensed at the one or more SGs 402a-402h occurred at the same time as user contact with the display screen 404. If the control circuit determines that the strain received at the one or more SGs 402a-402h occurred concurrently (or at least partially concurrently) with the user contact with the display screen 404, the control circuit can identify the this combination of input as indicative of user input with the display screen 404 and then use the signals received from the one or more SGs 402a-402h to determine a pressure of the user contact with the display screen 404, for example by comparing values derived from the signals received from the one or more SGs 402a-402h to values in the lookup table to identify a corresponding pressure value. In some implementations, in addition to comparing values derived from the signals received from the one or more SGs 402a-402h to values in the lookup table, the controller also compares value(s) indicative of the location of the user contact with the display screen 404 derived from the signals received from the display screen 404 to values in the lookup table to identify a corresponding pressure value.

For example, when the user contacts the display screen 404 at the location 406, this causes the display screen 404 (which is a touchscreen in this example) to provide one or more signals to the control circuit indicative of user contact with the location 406. The user contact at the location 406 also causes bowing of the housing of the electronic device 400 which, in this example, causes the SGs 402f and 402g to send signals indicating strain sensed by the SGs 402f and 402g to the control circuit. The control circuit determines that the strain sensed by the SGs 402f and 402g occurred concurrently with the contact at the location 406 sensed by the display screen 404. Based on this determination, the control circuit identifies the received combination of input signals as indicative of user interaction with the display screen 404 rather than user interaction with the sides of the housing of the electronic device 400. The control circuit uses the signals to determine pressure values indicative of the strain sensed by SGs 402f and 402g and the signals indicative of the location 406 to determine one or more location values indicative of the location 406 and compares these values to values stored in the lookup table to identify a corresponding pressure value for the user contact with the display screen 404. The control circuit then uses this information to determine that the electronic device 400 has received user input at the location 406 on the display screen 404 at a particular pressure. The control circuit then causes the electronic device 400 to perform one or more actions based on both the location of the user contact and the pressure of the user contact.

In some embodiments, the pressure value for the user contact with display screen 404 is categorized into one of a plurality of pressure ranges to determine a type of user input. For example, determined pressure in a first range can be identified as a touch input while a determined pressure in a second, higher range can be identified as a press input. In some embodiments, press inputs can be further categorized as soft-press or hard-press inputs (with hard-press inputs falling into a higher pressure range than soft-press inputs). The control circuit can cause the electronic device 400 to perform different actions based on the detected pressure of the user contact with display screen 404. For example, if the control circuit identifies the contact at location 406 as a touch input the control circuit can cause an application associated with an icon displayed at location 406 to open. If the control circuit identifies the contact at location 406 as a soft-press input, the control circuit can cause a list of options for the application associated with an icon displayed at location 406 to be displayed. If the control circuit identifies the contact at location 406 as a hard-press, the control circuit can cause a list of currently open applications to be displayed.

In some embodiments, the control circuit is configured to identify a change in pressure of user interaction with the display screen 404, e.g., as sensed by changes in strain sensed by one or more of the SGs 402a-402h. The control circuit can cause the electronic device 400 to perform different functions in response to an identified change in pressure of user contact with the display screen 404 over time. For example, the control circuit can cause the electronic device 400 to perform a zoom in function for displayed content in response to an identified increase in pressure applied to the display screen 404. As another example, the control circuit can cause the electronic device 400 to perform a zoom out function for displayed content in response to an identified decrease in pressure applied to the display screen 404. As yet another example, the control circuit can increase a volume setting of the electronic device 400 at a rate that correlates to an identified rate of increased pressure of user contact with the display screen 404.

In some embodiments, only certain combinations of signals indicative of concurrent user input at the display screen 404 and one or more of the SGs 402a-402h are identified as user input with the display screen 404. For example, in some embodiments, the control circuit can ignore user contact with the display screen 404 around the edges of the display screen 404 (e.g., within 5 mm of the edge of the display screen 404) when determining if signals received from the SGs 402a-402h is indicative of user interaction with the display screen 404 or user interaction with the sides of the housing of the electronic device 400. For example, the control circuit can receive signals indicative of strain sensed by SG 402b and signals indicative of user contact with the display screen 404 along the edge of the display screen 404 near the location of the SG 402b. In this example, the sensed strain and the contact near the edge of display screen 404 occur concurrently. The control circuit can determine that the contact with the display screen 404 is within a threshold proximity of the edge of the display screen 404 and use this determination to determine that the strain sensed by SG 402b is indicative of user interaction with the housing of electronic device 400. The control circuit can then determine that the user has selected SG 402b in response to this determination and cause the electronic device 400 to perform one or more actions in response to determining that the SG 402b has been selected by the user.

Continuing with this example, after receiving the first combination of signals from the display screen 404 and the SG 402b, the control circuit receives a second set of signals from the display screen 404 and the SG 402b indicating user contact with the display screen 404 and strain sensed at SG 402b, respectively. The control circuit can determine that the second contact with display screen 404 is more than the threshold proximity away from the edge of the display screen 404 and therefore determine that the received combination of signals is indicative of user interaction with the display screen 404. The control circuit can then use a value derived from the signal received from the SG 402b to determine a pressure value for the user contact with the display screen 404 at the location. For example, the control circuit can compare the value derived from the signal received from the SG 402b to values stored in the lookup table to determine a pressure for the user contact at the location. The control circuit can then cause the electronic device 400 to perform one or more actions based on the determined location and pressure. As previously described, the control circuit causes the electronic device 400 to perform different actions depending on whether the control circuit has determined that a received signal or combination of signals is indicative of user contact with the display screen 404 or user interaction with the sides of the housing of electronic device 400.

In some embodiments, the control circuit receives signals from the display screen 404 indicative of a multi-touch contact with the display screen 404. A multi-touch contact is concurrent contact with the display screen 404. For example, a user can contact the display screen 404 with multiple fingers at different locations of the display screen 404. As another example, the user can contact the display screen 404 with multiple fingers and then move her fingers toward or away from each other across the display screen 404. The control circuit additionally receives signals from one or more of the SGs 402a-402h indicating strain sensed at the one or more SGs 402a-402h. The control circuit can determine that the multi-touch contact with the display screen 404 occurred concurrently with the sensed strain to determine that the received combination of signals is indicative of multi-touch contact with the display screen 404 rather than user interaction with the sides of the housing of the electronic device 400. The control circuit can compare values derived from the received combination of signals to values stored in the lookup table to identify a pressure for the multi-touch input. The control circuit can then cause the electronic device 400 to perform one or more actions based on the determined locations for the multi-touch contact and the determined pressure of the multi-touch contact.

In some scenarios, the SGs 402a-402h can detect identical or near identical levels of strain for different types of contacts. For example, the SG 402a can detect a first strain and the SG 402b can detect a second strain during a first, single location contact with the display screen 404. The control circuit can use this information to determine a pressure of the single location contact with the display screen 404. The SGs 402a and 402b can then later experience the same respective strains during a second, multi-touch contact with the display screen 404. The fact that the second combination of signals is indicative of the multi-touch contact while the first combination of signals is indicative of a single location contact can cause the control circuit to identify two different pressure values for the user contact with the display screen 404 even though the SGs 402a and 402b detected the same level of strain for both the single location and the multi-touch contacts. For example, the location value(s) for the single location and the multi-touch contacts can cause the control circuit to access different portions of the lookup table to determine the corresponding pressures for the single location and multi-touch contacts.

In some embodiments, the control circuit uses location information for a contact with the display screen 404 along with pressure values derived from signals received from one or more of the SGs 402a-402h to determine if a received combination of signals is indicative of user interaction with the sides of the housing of the electronic device 400, user interaction with the display screen 404, or both. For example, the user can contact the display screen 404 at the location 406. In this context contact at the location 406 refers to contact with the display screen 404 in an area proximate location 406, therefore two different touch contacts that are not at the exact same location on the display screen can both constitute contact at location 406 so long as the two different touch contacts are in a proximate area of location 406.

The contact at the location 406 causes the display screen 404 to send signals to the control circuit indicating contact at the location 406 and also causes the SGs 402f and 402g to send signals to the control circuit indicating strain sensed at the SGs 402f and 402g due to bowing of the housing of the electronic device 400 caused by the user contact with the display screen 404 at the location 406. The control circuit can determine that the SGs 402f and 402g are located relatively near the location 406 (e.g., within a threshold proximity of the location 406) and therefore determine that the received combination of signals is indicative of user contact at the location 406 and subsequently use some or all of the signals to determine a pressure for the user contact at the location 406, as described above. Continuing with this example, the control circuit can later receive signals from the display screen 404 indicating another user contact at location 406 concurrently with signals indicating sensed strain at SGs 402f and 402g as well as SG 402a. In this example, the control circuit can determine that since SG402a is not proximate to the location 406, that this combination of signals received from the display screen 404 and the SGs 402a, 402f, and 402g is indicative of both user interaction with the housing of the electronic device 400 near the SG 402a (e.g., the user pressing on the location of the SG 402a) and user contact with the display screen at location 406. The control circuit can then cause the electronic device 400 to perform one or more actions in response to identifying both the contact with the display screen 404 and the selection of SG 403a.

In some embodiments, the control circuit will compare the pressure levels of strain detected at the SGs 402a-402h to determine if touchscreen contact and user interaction with one or more of the SGs 402a-402h (e.g., by pressing on the sides of the housing of the electronic device 400) is occurring simultaneously. For example, the control circuit can receive signals from the display screen 404 indicating another user contact at location 406 concurrently with signals indicating sensed strain at SGs 402f and 402g as well as SG 402a. The control circuit can then compare the pressure levels of the strain detected by the SGs 402a, 402f, and 402g to determine that the pressure detected by SG 402a is higher than the pressure detected by SGs 402f and 402g. Because the SG 402a is further from the location 406 than the SGs 402f and 402g, the control circuit can interpret the fact that the SG 402a is experiencing a greater level of pressure than the SGs 402f and 402g as an indication that the user is both contacting the display screen 404 at the location 406 and pressing the SG 402a. The control circuit can then cause the electronic device 400 to perform one or more actions in response to identifying both the contact with the display screen 404 and the selection of SG 403a.

In some embodiments, the control circuit can also use values derived from signals received from one or more of the SGs 402a-402h to determine if a received combination of signals is indicative of user contact with the display screen 404 or user selection of one or more of the SGs 402a-402h without relying on inputs received from the display screen 404. For example, the control circuit can compare values derived from the signals received concurrently from one or more of the SGs 402a-402h to entries in the lookup table. If the combination of determined values is outside of a threshold similarity to any entry of the lookup table, the control circuit can determine that the signals received from one or more of the SGs 402a-402h are indicative of user interaction with the one or more of the SGs 402a-402h and not user interaction with the display screen 404. Conversely, if the combination of determined values is within the threshold similarity to one or more entries of the lookup table, the control circuit can determine that the signals received from the one or more of the SGs 402a-402h are indicative of user interaction with the display screen 404. The control circuit can then use the lookup table to determine a pressure value for the user interaction with the display screen 404. As another example, the lookup table can include a number of entries that are indicative of user interaction with the display screen 404, a number of entries that are indicative of user interaction with one or more of the SGs 402a-402h, and a number of entries that are indicative of concurrent user interaction with the display screen 404 and one or more of the SGs 402a-402h. The control circuit can compare signals received from one or more of the SGs 402a-402h and/or the display screen 404 to entries in the lookup table to identify a corresponding entry (or a plurality of closest matching entries) and then determine if the identified entry (or entries) is associated with user interaction with the display screen 404, user interaction with one or more of the SGs 402a-402h, or a combination of both.

In some embodiments, the control circuit analyzes the timing of various received signals in determining what type of user interaction with the electronic device 400 has occurred and/or to identify a pressure of user interaction with the display screen 404. For example, the control circuit can identify relative timing of when signals are received from one or more of the SGs 402a-402h and when signals are received from the display screen 404. If the signals from the one or more of the SGs 402a-402h and the display screen 404 are received within a threshold time of each other, the control circuit can determine that the combination of signals is possibly indicative of user interaction with the display screen 404. If the signals are not received within the threshold time of each other, the control circuit can determine that the combination of signals is indicative of separate user interaction with the display screen 404 and user interaction with the one or more of the SGs 402a-402h. As another example, the control circuit can take into account both timing and duration of strain sensed at one or more of the SGs 402a-402h and user contact sensed by the display screen 404. If the duration and timing of the received signals does not overlap by a minimum threshold, the control circuit can determine that the received combination of signals is indicative of separate user interaction with the display screen 404 and one or more of the SGs 402a-402h.

Still referring to FIG. 4, the electronic device 400 can be configured to conduct a calibration process for populating a lookup table for use in determining a type of user input based on signals received from one or more of the SGs 402a-402h and/or signals received from the display screen 404 as well as identifying a pressure value for user contact with the display screen 404 based on those received signals. For example, the control circuit can be configured to enter a calibration mode for calibrating touch input pressure identification functionality of the electronic device 400. In some embodiments, the calibration mode is only available prior to delivery of the electronic device 400 to an end user (e.g., calibration is only performed at a location of manufacture or a retail location).

Calibration of the touchscreen contact pressure sensing functionality of the electronic device 400 (described above) will most likely be performed by a robot at a location of manufacture of the electronic device 400 but could also be performed by a robot at a different location, or by a human. Calibration of the touchscreen contact pressure sensing functionality of the electronic device 400 can also be performed after the electronic device 400 has been in use for a period of time. For example, the electronic device 400 can be recalibrated every year. Calibration can include, for example, application of various pressures to each of a plurality of calibration locations on the display screen 404 by a robot. For example, a calibration process performed by the robot while the electronic device 400 is in a calibration mode can include identification of a plurality of calibration locations 408 on the display screen 404. In some embodiments the calibration locations 408 are equally spaced from each other, as shown in the example in FIG. 4. In some embodiments, the calibration locations 408 are laid out in an m×n rectangular fashion, as shown in the example in FIG. 4.

The robot can apply various different pressures to each of the calibration locations 408, in sequence, and the pressure values sensed by the SGs 402a-402h (or pressure values derived from signals provided by the SGs 402a-402h) are used to populate the lookup table. The values populated into the lookup table are then associated with the corresponding pressure being applied by the robot and/or the location of the calibration location 408 to which the pressure is being applied by the robot. The pressures applied by the robot to each calibration location 408 can be spaced apart by regular intervals. For example, the robot can apply pressures of 5 newtons, 10 newtons, 15 newtons, and 20 newtons to each of the calibration locations 408. Each time the robot applies a pressure to a particular calibration location 408, the associated strain values sensed by the SGs 402a-402h (or values derived from the sensed strains) are stored in the lookup table and associated with the pressure applied by the robot and the location. For example, during the calibration process, the robot applies 5 newtons of force to the calibration location 408d. Pressure values derived from signals received by the control circuit from the SGs 402a-402h while the robot is applying the 5 newtons of force to the calibration location 408d are stored in the lookup table and associated with the calibration location 408d and a pressure input of 5 newtons. The robot then applies 10 newtons of force to the calibration location 408d. Pressure values derived from signals received by the control circuit from the SGs 402a-402h while the robot is applying the 10 newtons of force to the calibration location 408d are stored in the lookup table and associated with the calibration location 408d and a pressure input of 10 newtons. This same process is repeated for each pressure value for each calibration location 408 to populate the lookup table.

In some embodiments, the calibration process is repeated multiple times and each entry in the lookup table is an average of the values sensed for each applied pressure at each calibration location 408. In some embodiments, the robot applies the same pressure to the calibration location 408 multiple times sequentially and pressure signals received from the SGs 402a-402h for each application of pressure are averaged to populate an entry in the lookup table. After the same pressure is applied to a particular calibration location 408 a specified number of times (e.g., 5 or 10 times) the calibration process moves onto a different pressure value, or to a different calibration location 408 if all pressure applications for a given calibration location 408 have been completed.

In some embodiments, the lookup table is also populated with pressure values sensed by the SGs 402a-402h when no pressure is being applied to the display screen 404 (e.g., a baseline entry). In some embodiments, the lookup table can also be populated with entries indicative of multi-touch contact. For example, the robot can apply contact to multiple calibration locations 408 simultaneously to populate the lookup table with sensed pressure values from the SGs 402a-402h for various multi-touch inputs. In some embodiments, pressure values derived from signals received from the SGs 402a-402h are only included in the lookup table if they exceed a minimum threshold. For example, during calibration of the electronic device 400 with respect to calibration location 408c, the closest SGs are SG 402f and SG 402g. In this example, application of pressure to calibration location 408c may cause SGs 402f and 402g to experience strain that exceeds the threshold while the other SGs 402 experience an amount of strain that is below the threshold. In this example, the pressure values derived from the signals received from SGs 402f and 402g are entered into the lookup table and associated with the calibration location 408c and the respective pressure applied to the display screen 404 while values from the other SGs 402 are not entered into the lookup table. Values for the other SGs 402 for this particular lookup table entry can be, in some embodiments, set to zero or null.

In some embodiments, at each calibration location 408, the touch contact location and the values from all sensors are recorded in the lookup table. The SG response values (e.g., count values received from the ADC connected to each SG 402 calculated as an offset from a 0 N baseline) at each calibration location 408 are then fit to a linear or polynomial curve. That is, for each touch location (x,y) there are a set of P x,y (i,z) functions containing polynomial coefficients $a_0, \ldots, a_n$ that maps the ADC value z for each SG 402 to a force value (e.g., nominally in Newtons). Responses for distant SGs 402 may be discarded, for example, functions for the bottom SGs 402 may not be calculated for touch locations at the top of the screen. This can be determined by examining which are the most responsive SGs (e.g. greatest $\Sigma\, a_i$) for each touch location.

Figure 5:
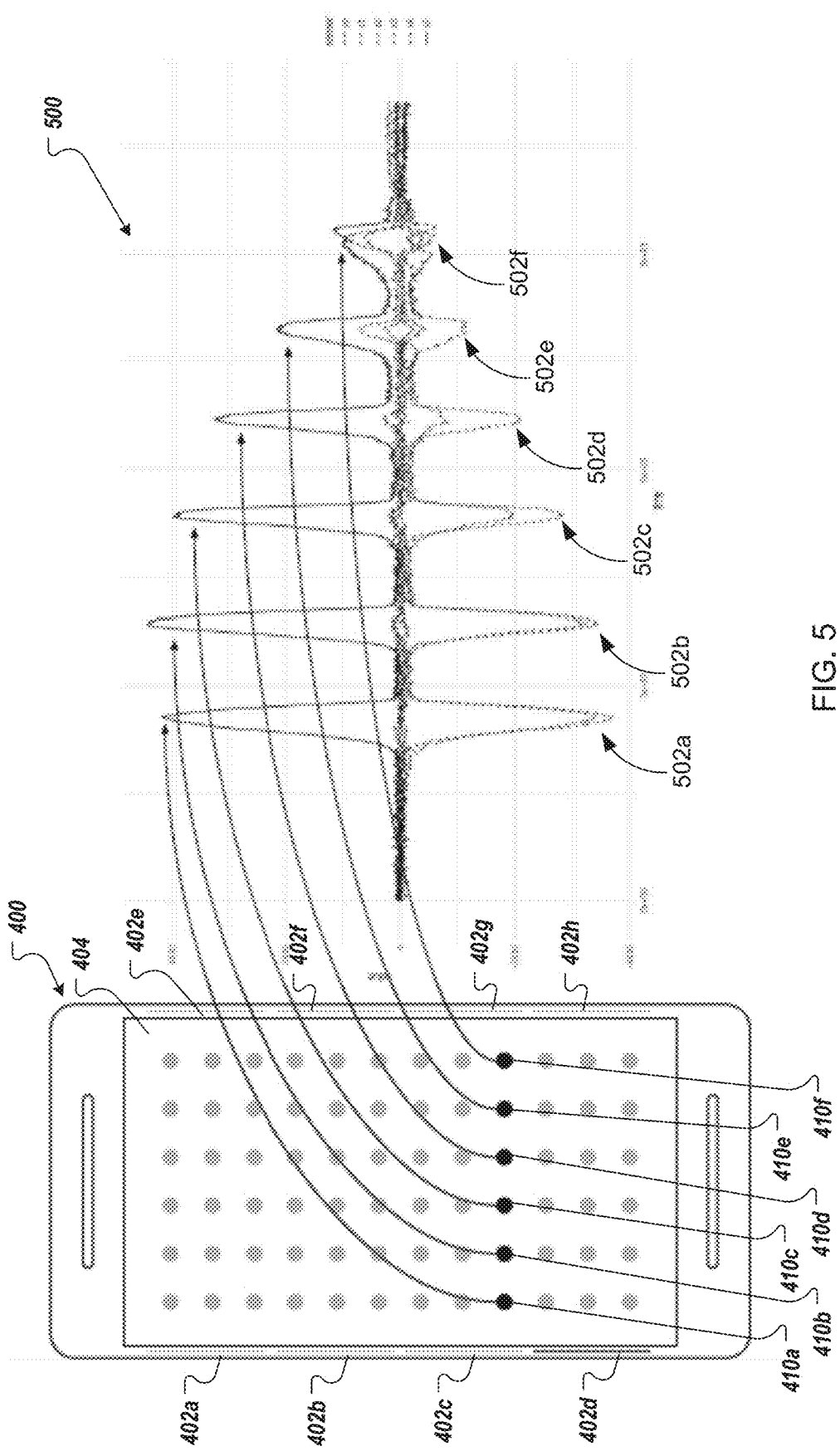
FIG. 5 illustrates the electronic device of FIG. 4 and a graph of pressures sensed at one or more of the strain gauges of the device when touch input is applied to various portions of a screen of the electronic device.

FIG. 5 shows the electronic device 400 along with a graph 500 showing pressure values sensed by each of the SGs 402a-402h when pressure is applied to different locations on the display screen 404. This pressure applied to the locations on the display screen 404 can occur during a calibration process, as described above, or during use of the electronic device 400 by a user. The graph 500 shows strain values (e.g., count outputs from ADCs connected to the SGs 402a-402h) for each of the SGs 402a-402h. The graph 500 shows corresponding strain values when a user contacts locations 410a-410f at corresponding times 502a-502f.

As shown in FIG. 5, when pressure is applied to location 410a, different levels of strain are sensed by each of the SGs 402a-402h. For example, as shown by graph 500, when a user (or calibration robot) presses location 410a at time 502a, different SGs of the SGs 402a-402h experience different levels of strain due to bowing of the housing of the electronic device 400 caused by contact with the display screen 404 at location 410a. In this example, the SG 402c experiences the highest level of strain and therefore shows the highest peak at time 502a on graph 500. Other nearby SGs experience relatively high levels of strain due to the contact at location 410a while other SGs experience relatively little strain. The graph 500 additionally shows strains sensed by the SGs 402a-402h when contact is made with locations 410b-f at corresponding times 502b-f. When in calibration mode, these sensed values (e.g., ADC count values) for the contact at each location 410a-f are stored in the lookup table along with an indication of the corresponding location and the amount of pressure applied at the time 502. When in a non-calibration mode (e.g., regular use) the sensed values at the times 502a-f are compared to values in the lookup table to identify a pressure for the user contact with the display screen 404.

Figure 6:
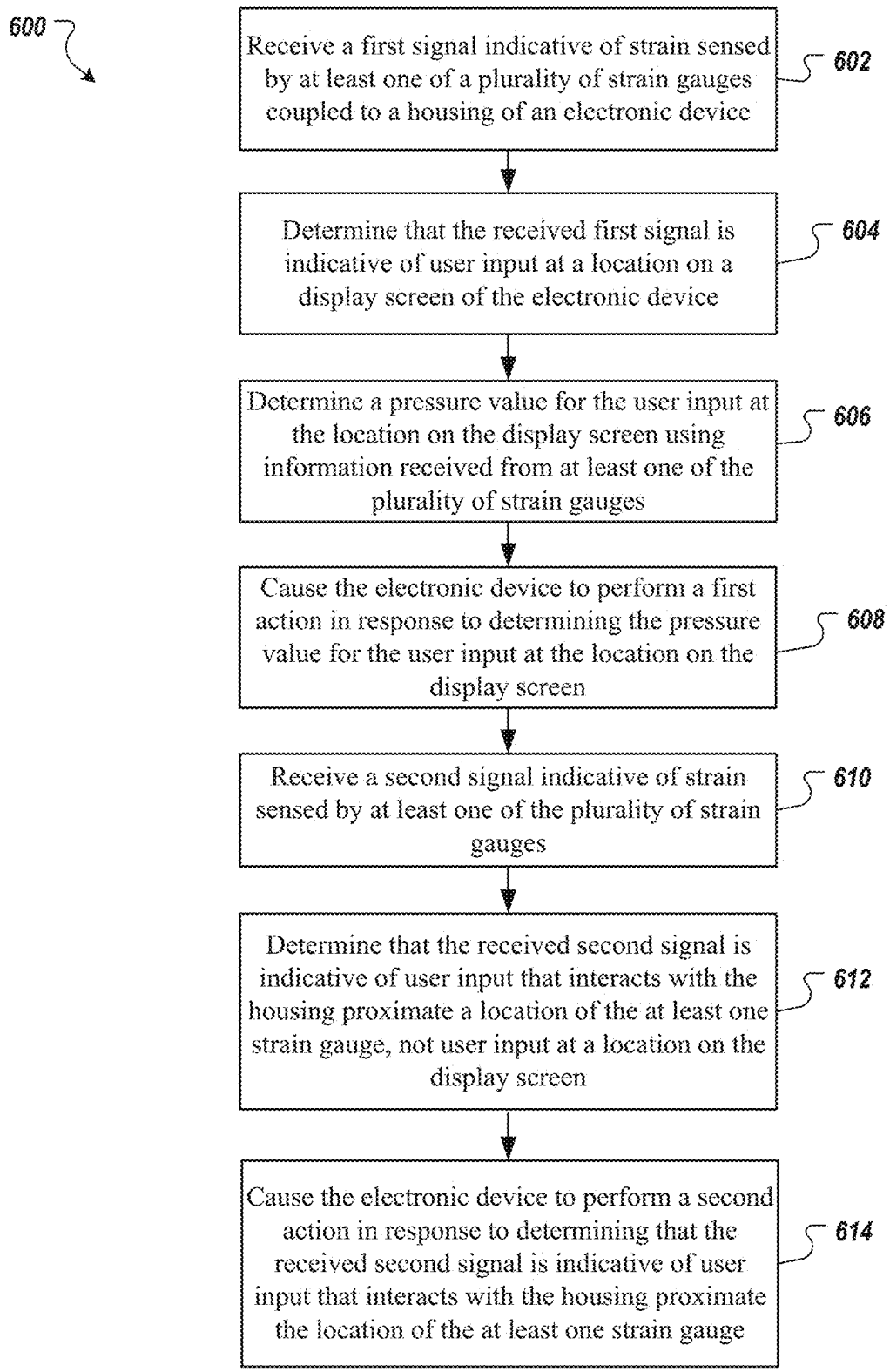
FIG. 6 is a flow diagram of an example process for receiving and analyzing user input to an example electronic device.

FIG. 6 shows a flow diagram of an example process 600 for receiving and analyzing user input to an example electronic device. The process includes receiving a first signal indicative of strain sensed by at least one of a plurality of strain gauges coupled to a housing of an electronic device (602). For example, one or more of the SGs 402a-h of the electronic device 400 of FIG. 4 experience strain and provide signals to a control circuit indicative of the strain, such as an ADC count value produced by an ADC coupled to the SG being provided to a microprocessor.

Next, it is determined that the received first signal is indicative of user input at a location on a display screen of the electronic device (604). This can be accomplished, for example, using one or more of the techniques described with respect to FIG. 4. For example, signals from a touch screen can indicate that a user contacted the touch screen concurrently with the sensed strain at the one or more stain gauges. This can indicate that the received first signal is indicative of user input at a location on the display screen. As another example, a controller of the electronic device can compare one or more values derived from the first signal to values in a lookup table to determine that the received first signal is indicative of user input at the location on the display screen.

A pressure value for the user input at the location on the display screen is determined using information received from at least one of the plurality of strain gauges (606). This can be accomplished, for example, by comparing the values of the information received from the strain gauges to values stored in a lookup table to identify a corresponding pressure value for the user contact with the display screen. The pressure value can be, for example, in units of newtons. In some embodiments, the identified pressure is used to identify a type of user contact with the display screen, such as a touch, soft-press, or hard-press.

A control circuit of the electronic device causes the electronic device to perform a first action in response to determining the pressure value for the user input at the location on the display screen (608). For example, the control circuit can cause a program associated with an icon displayed at the touched location on the display screen to open in response to determining that the user input represents a touch. As another example, in response to determining that the user contact at the location on the display screen is a press input, the control circuit can cause a menu of options for a program associated with an icon displayed at the location to be displayed on the display screen.

A second signal indicative of strain sensed by at least one of the plurality of strain gauges is received (610). For example, the control circuit receives ADC count values from one or more ADCs associated with each respective strain gauge.

It is determined that the received second signal is indicative of user input that interacts with the housing proximate a location of the at least one strain gauge, not user input at a location on the display screen (612). For example, a lack of signals indicating user interaction with a touch screen can indicate that the second signal is indicative of user input that interacts with the housing proximate a location of the at least one strain gauge. As another example, a lookup table can be used to identify that the second signal is indicative of user interaction with the housing proximate the location of the at least one strain gauge.

The control circuit causes the electronic device to perform a second action in response to determining that the received second signal is indicative of user input that interacts with the housing proximate the location of the at least one strain gauge (614). For example, the control circuit can increase a volume setting of the electronic device in response to determining that the received second signal is indicative of user input that interacts with the housing proximate the location of the at least one strain gauge. As another example, the control circuit can cause the electronic device to provide a display of scrolling through a menu in response to determining that the received second signal is indicative of user input that interacts with the housing proximate the location of the at least one strain gauge. As another example, the control circuit can cause a display of the electronic device to zoom out in response to determining that the received second signal is indicative of user input that interacts with the housing proximate the location of the at least one strain gauge.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Various embodiments of the systems and techniques described here can be realized in digital electronic circuitry, integrated circuitry, specially designed ASICs, computer hardware, firmware, software, and/or combinations thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments have been described. Nevertheless, it will be understood that various modifications may be made without departing from the spirit and scope of the disclosed technology. For example, various forms of the flows shown above may be used, with steps re-ordered, added, or removed. Also, although several applications of the strain gauge sensing unit system and methods have been described, it should be recognized that numerous other applications are contemplated. Accordingly, other embodiments are within the scope of the following claims.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An electronic device, comprising:
   a housing;
   a plurality of strain gauges coupled to the housing of the electronic device;
   a touchscreen display device positioned along a front surface of the electronic device;
   an electronic circuit electrically coupled to the plurality of strain gauges; and
   computer-readable memory storing instructions that, when executed by the electronic circuit, cause the electronic device to perform operations comprising:
      receive a first signal indicative of strain sensed by a first strain gauge of the plurality of strain gauges,
      receive a second signal indicative of strain sensed by a second strain gauge of the plurality of strain gauges,
      identify a user-selected location at which user input contacted the touchscreen display device,
      identify that a first touchscreen calibration location is closest to the user-selected location, from among multiple touchscreen calibration locations,
      access a lookup table that stores, for each respective touchscreen calibration location of the multiple touchscreen calibration locations:
         (i) multiple strain values for the first strain gauge that correspond to multiple calibrated pressures applied to the respective touchscreen calibration location, and
         (ii) multiple strain values for the second strain gauge that correspond to the multiple calibrated pressures applied to the respective touchscreen calibration location,
      determine a first numerical strain value for the first signal, the first numerical strain value being indicative of the strain sensed by the first strain gauge,
      determine a second numerical strain value for the second signal, the second numerical strain value being indicative of the strain sensed by the second strain gauge,
      determine first differences between the first numerical strain value and each of the multiple strain values that correspond to the multiple calibrated pressures and that are stored in the lookup table for the first strain gauge and the first touchscreen calibration location,
      determine second differences between the second numerical strain value and each of the multiple strain values that correspond to the multiple calibrated pressures and that are stored in the lookup table for the second strain gauge and the first touchscreen calibration location,
      determine that the first signal and the second signal are indicative of a particular pressure applied to the touchscreen display device at the user-selected location from among the multiple calibrated pressures, based on analysis of the first differences between the first numerical strain value and each of the multiple strain values for the first strain gauge that are stored in the lookup table for the first touchscreen calibration location and analysis of the second differences between the second numerical strain value and each of the multiple strain values for the second strain gauge that are stored in the lookup table for the first touchscreen calibration location, and
      perform a first action that corresponds to the user input being received at the user-selected location on the touchscreen display device with the particular pressure, in response to determining that the first signal and the second signal are indicative of the particular pressure being provided at the user-selected location on the touchscreen display device.

2. The electronic device of claim 1, wherein:
   the electronic device includes a first lateral side and a second lateral that are parallel to each other and that are transverse to the front surface of the electronic device; and
   the first strain gauge and the second strain gauge are each coupled to the housing of the electronic device at the first lateral side.

3. The electronic device of claim 2, wherein the operations include identifying that the first signal and the second signal were received concurrent with the user input that contacted the touchscreen display device.

4. The electronic device of claim 3, wherein:
   the electronic device is configured to perform a second action response to receiving user input that contacts the first lateral side of the electronic device; and
   the electronic device performs the first action rather than the second action as a result of having identified that the first signal and the second signal were received concurrent with the user input that contacted the touchscreen display device.

5. The electronic device of claim 2, wherein the electronic device is configured to:
   identify a second touchscreen calibration location that is close to the user-selected location, from among the multiple touchscreen calibration location;
   identify a first distance between the user-selected location and the first touchscreen calibration location;
   identify a second distance between the user-selected location and the first touchscreen calibration location;
   apply a first weight to one or move values in the lookup table associated with the first touchscreen calibration location, based on the first distance; and
   apply a second weight to one or more values in the lookup table associated with the second touchscreen calibration location, based on the second distance.

6. The electronic device of claim 5, wherein determining that the first signal and the second signal are indicative of the particular pressure being applied to the touchscreen display device at the user-selected location is further based on:

analysis of third differences between the first numerical strain value and each of multiple strain values for the first strain gauge that are stored in the lookup table for the second touchscreen calibration location; and analysis of fourth differences between the second numerical strain value and each of multiple strain values for the second strain gauge that are stored in the lookup table for the second touchscreen calibration location.

7. The electronic device of claim 2, wherein the electronic device being configured to determine that the first signal and the second signal are indicative of the particular pressure includes determining that the first numerical strain value most closely matches, in the lookup table, a particular strain value for the first strain gauge that corresponds to the particular pressure value.

8. The electronic device of claim 2, wherein the lookup table is populated with values based on application of multiple pressures to each of the multiple touchscreen calibration locations by a robot.

9. The electronic device of claim 1, wherein the electronic device is configured to perform a second action that is different from the first action in response to determining that (i) user input is received at same said user-selected location, and (ii) determining that the first signal and the second signal are indicative of a second pressure being provided at the user-selected location rather than the first pressure.

10. The electronic device of claim 9, wherein:

the first action corresponds to a soft-press user input at the user-selected location; and the second action correspond to a hard-press user input at the user-selected location.

11. A method of sensing user input provided at an electronic device, comprising:

receiving, by an electronic device, a first signal indicative of strain sensed by a first strain gauge of a plurality of strain gauges of the electronic device;

receiving, by the electronic device, a second signal indicative of strain sensed by a second strain gauge of the plurality of strain gauges;

identifying, by the electronic device, a user-selected location at which user input contacted a touchscreen display device of the electronic device;

identifying, by the electronic device, that a first touchscreen calibration location is closest to the user-selected location, from among multiple touchscreen calibration locations, access a lookup table that stores, for each respective touchscreen calibration location of the multiple touchscreen calibration locations:

(i) multiple strain values for the first strain gauge that correspond to multiple calibrated pressures applied to the respective touchscreen calibration location, and (ii) multiple strain values for the second strain gauge that correspond to the multiple calibrated pressures applied to the respective touchscreen calibration location;

determining, by the electronic device, a first numerical strain value for the first signal, the first numerical strain value being indicative of the strain sensed by the first strain gauge;

determining, by the electronic device, a second numerical strain value for the second signal, the second numerical strain value being indicative of the strain sensed by the second strain gauge;

determining, by the electronic device, first differences between the first numerical strain value and each of the multiple strain values that correspond to the multiple calibrated pressures and that are stored in the lookup table for the first strain gauge and the first touchscreen calibration location;

determining, by the electronic device, second differences between the second numerical strain value and each of the multiple strain values that correspond to the multiple calibrated pressures and that are stored in the lookup table for the second strain gauge and the first touchscreen calibration location;

determining, by the electronic device, that the first signal and the second signal are indicative of a particular pressure applied to the touchscreen display device at the user-selected location from among the multiple calibrated pressures, based on analysis of the first differences between the first numerical strain value and each of the multiple strain values for the first strain gauge that are stored in the lookup table for the first touchscreen calibration location and analysis of the second differences between the second numerical strain value and each of the multiple strain values for the second strain gauge that are stored in the lookup table for the first touchscreen calibration location; and performing, by the electronic device, a first action that corresponds to the user input being received at the user-selected location on the touchscreen display device with the particular pressure, in response to determining that the first signal and the second signal are indicative of the particular pressure being provided at the user-selected location on the touchscreen display device.

* * * * *